United States Patent
O'Connor

(10) Patent No.: US 7,204,090 B2
(45) Date of Patent: Apr. 17, 2007

(54) MODULATED CURRENT GAS TURBINE ENGINE STARTING SYSTEM

(75) Inventor: Richard John O'Connor, Gloucester (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 329 days.

(21) Appl. No.: 10/868,848

(22) Filed: Jun. 17, 2004

(65) Prior Publication Data

US 2005/0279102 A1 Dec. 22, 2005

(51) Int. Cl.
F02C 7/06 (2006.01)
F02C 7/268 (2006.01)

(52) U.S. Cl. ............ 60/778; 60/39.08; 60/786; 60/788

(58) Field of Classification Search .......... 60/39.08, 60/736, 778, 786, 788
See application file for complete search history.

(56) References Cited

U.S. PATENT DOCUMENTS

| | | | |
|---|---|---|---|
| 2,681,694 A * | 6/1954 | Loft | 60/786 |
| 2,949,011 A | 8/1960 | Bancroft | |
| 4,684,081 A | 8/1987 | Cronin | 244/58 |
| 4,705,100 A | 11/1987 | Black et al. | 165/40 |
| 5,121,598 A | 6/1992 | Butler | 60/39.08 |
| 5,165,223 A | 11/1992 | Ingham et al. | 60/39.06 |
| 5,172,543 A * | 12/1992 | White | 60/778 |
| 5,241,814 A | 9/1993 | Butler | 60/39.08 |
| 5,253,470 A | 10/1993 | Newton | 60/39.08 |
| 5,428,275 A | 6/1995 | Carr et al. | 318/146 |
| 5,442,907 A | 8/1995 | Asquith et al. | 60/39.06 |
| 5,561,350 A | 10/1996 | Frus et al. | 315/209 R |
| 5,615,547 A | 4/1997 | Beutin et al. | 60/39.08 |
| 5,899,411 A | 5/1999 | Latos et al. | 244/53 A |
| 6,018,941 A | 2/2000 | Massey | 60/39.142 |
| 6,035,626 A | 3/2000 | Wahl et al. | 60/39.02 |
| 6,256,977 B1 | 7/2001 | McGinley et al. | 60/39.142 |
| 6,434,473 B1 | 8/2002 | Hattori | 701/100 |
| 6,457,563 B1 * | 10/2002 | Ahlbom et al. | 184/6.21 |
| 6,467,725 B1 | 10/2002 | Coles et al. | 244/58 |

* cited by examiner

Primary Examiner—L. J. Casaregola
(74) Attorney, Agent, or Firm—Ogilvy Renault LLP

(57) ABSTRACT

A method and an apparatus for starting a gas turbine engine under various conditions are used to distribute a varying total amount of electric power to at least one of a starter, a fuel heater and an oil heater while providing fuel.

8 Claims, 3 Drawing Sheets

MODULATED CURRENT GAS TURBINE ENGINE STARTING SYSTEM

FIELD OF THE INVENTION

The present invention relates to an aircraft gas turbine engine, and more particularly to a gas turbine engine starting system regulated with electric power supplied thereto.

BACKGROUND OF THE INVENTION

In an aircraft gas turbine engine, a starter motor applies torque to the engine's shaft in order to start the engine. As the shaft starts to rotate, air is inducted into the compressor, compressed and then discharged into the combustor. Concurrently, the engine's fuel control system feeds fuel into the combustor in accordance with a pre-programmed fuel schedule in order to precisely maintain the proper fuel/air ratio in the combustor, thereby achieving a light-off condition. After light-off, the starter motor torque is augmented by torque from the engine's turbine. Before reaching idling speed of the engine, the starter motor is shut off. This operation constitutes a starting cycle of a gas turbine engine.

DC (Direct Current) motors are commonly used as starters. The torque vs. speed characteristic of DC motors is fixed when the electric power supplied to the DC motors is predetermined and unchangeable, which is typically the case when batteries are used as the electric power source. However, the resistance to rotation of the gas turbine engine during the starting cycle is variable under different conditions. The resistance elements include the inertia of the engine rotor with all rotating components of the engine, oil drag, and aerodynamic components which include the load applied to the rotor of engine by air flow inducted into the engine when the engine is rotated by the starter. Therefore, the resistance varies when engine starting conditions change. For example, temperature change will vary the oil viscosity and thereby the oil drag. Temperature and altitude changes will also vary the density of the air, resulting in changes of aerodynamic components. Thus, the starter is not always enabled to efficiently start the engine under all conditions.

This problem is more severe when an auxiliary power unit (APU) engine is concerned. APU engines are usually operated on the ground to provide pneumatic power, AC (Alternating Current) current and cooling air to the aircraft, especially before the main engine of the aircraft is started and operated at a self-sustaining level. During flight the APU engines are usually not in operation. However, in some emergency situations, APU engines are used as an emergency power unit (EPU) and are required to start at a high altitude and under cold conditions during flight, which is significantly different from the starting conditions on the ground. The conventional gas turbine engine starting system is not adapted for starting engines under such conditions.

Therefore, there is a need for a gas turbine engine starting system adapted for effectively starting a gas turbine engine under various conditions.

SUMMARY OF THE INVENTION

One object of the present invention is to provide a gas turbine engine starting system adapted to effectively start a gas turbine engine under various conditions.

In accordance with one aspect of the present invention, there is provided a method of starting a gas turbine engine which comprises providing fuel to a plurality of fuel nozzles and regulating a varying total amount of electric power supplied to at least one of a starter, a fuel heater and an oil heater. The varying total amount of electric power is regulated as a function of engine rotor speed and a function of at least one parameter selected from parameters of a fuel temperature, an oil temperature, an engine inlet air temperature, an air pressure differential between an engine inlet and an engine outlet, and an altitude where the engine is positioned.

In accordance with another aspect of the present invention, there is provided a method of starting a gas turbine engine which comprises providing fuel to a plurality of fuel nozzles and distributing a varying total amount of electric power between a starter, a fuel heater and an oil heater.

In accordance with a further aspect of the present invention, there is provided an aircraft turbine engine starting system which comprises a starter operably connected with the engine and configured to initiate an engine starting cycle which includes engine rotation and fuel ignition, and at least one of but preferably both a fuel heater for heating fuel before ignition thereof during the starting cycle and an oil heater for heating oil during the starting cycle. A means is provided for distributing electric power supplied from an electric power source between the starter and at least one of the fuel heater and oil heater, but preferably between the starter, fuel heater and oil heater, in order to provide power thereto. A controller is operably connected with the distribution means and configured to control the distribution means for regulating a varying amount of electric power distributed to each of the starter and at least one of the fuel heater and oil heater, but preferably to each of the starter, fuel heater and oil heater, during the starting cycle.

The distribution means preferably comprises a pulse-width modulator controlled by the controller to regulate the varying amount of electric power distributed to each of the starter, fuel heater and oil heater during the starting cycle.

The present invention advantageously provides a method and system to effectively start any type of engine under various starting conditions, and more especially to effectively start a APU engine regardless of being on the ground or during flight.

BRIEF DESCRIPTION OF THE DRAWINGS

Reference will now be made to the accompanying drawings showing by way of illustration, a preferred embodiment of the present invention, in which.

DETAILED DESCRIPTION OF THE PREFERRED EMBODIMENT

Figure 1:
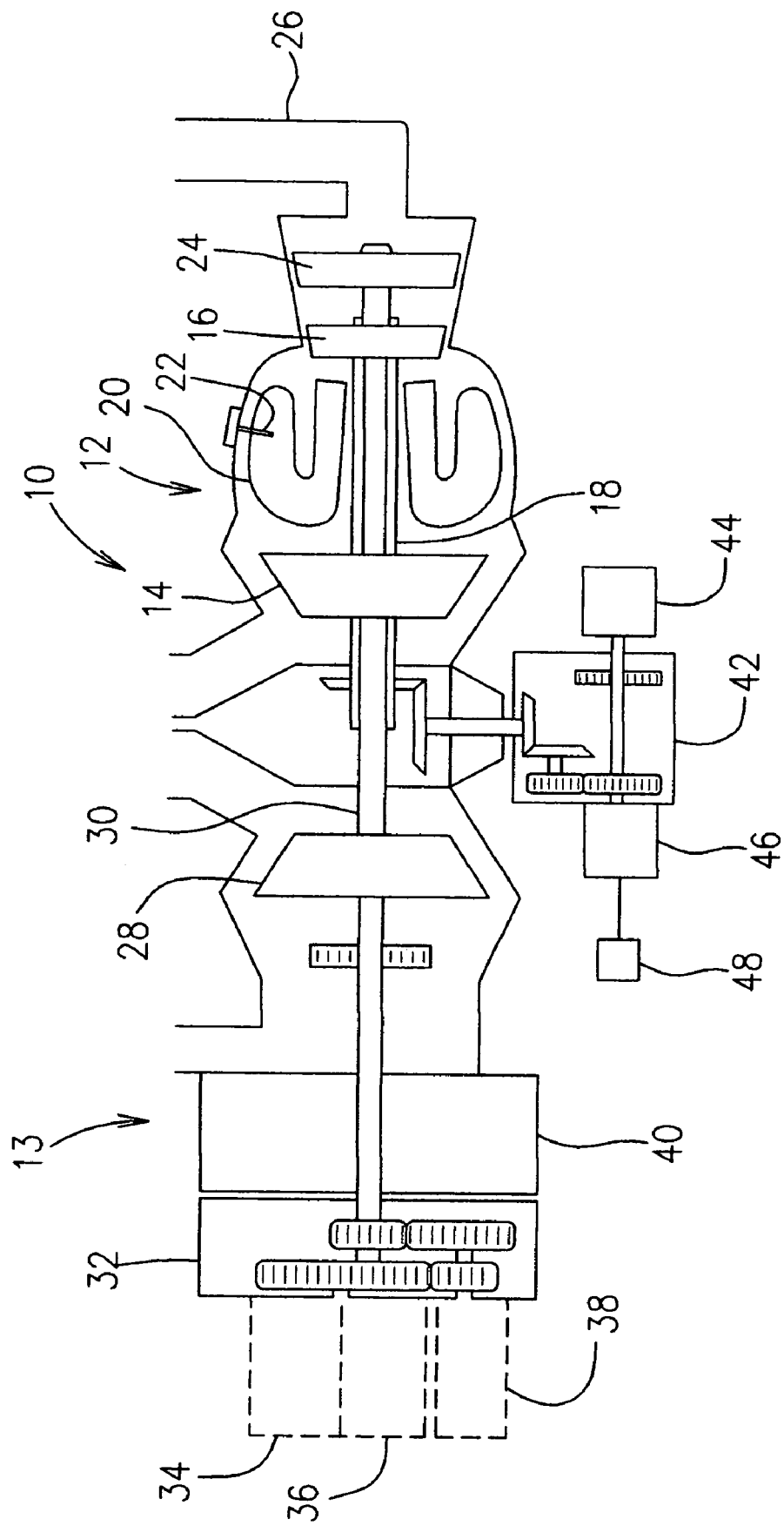
FIG. 1 is a schematic cross-sectional view of an APU engine, exemplarily showing one application of the present invention.

Referring to FIG. 1, a gas turbine engine 10, which is illustrated as a APU engine but can be any type of gas turbine engine, includes an embodiment of the present invention which will be further described with reference to other figures of the drawings. Engine 10 generally includes a core section 12 and a load section 13. In the core section 12 a high pressure compressor 14 is driven by a high pressure turbine 16 through a hollow shaft 18 in order to provide necessary air pressure and flow for combustion in an annular combustor 20. A plurality of fuel nozzles 22 (only one shown) are provided to inject fuel into the combustor 20 for combustion. The combustion gases discharged from the combustor 20 power the high pressure turbine 16 and also drive a power turbine 24, and are then discharged through an exhaust duct 26 (the engine outlet). The power turbine 24 rotates a load compressor 28 in the load section 13 through a shaft 30 in order to provide pneumatic power to the aircraft. The shaft 30 extends further into a load gear box 32 which reduces the power turbine speed to drive AC generators 34, 36 and cooling fan 38. The load section 13 usually includes an oil tank 40 to provide lubricant to the engine. Engine 10 further includes an accessory gear box 42 which is linked to the hollow shaft 18 and driven by the high pressure turbine 16 during engine operation to provide drives for engine accessories, such as fuel pump 44 and oil pump (not shown). A starter motor 46 which is conventionally a DC motor, is linked to the hollow shaft 18 through the accessory gearbox linkage and is operably connected to an electric power source 48 such as batteries, to initiate and maintain an engine starting cycle in order to start the engine 10.

Figure 2:
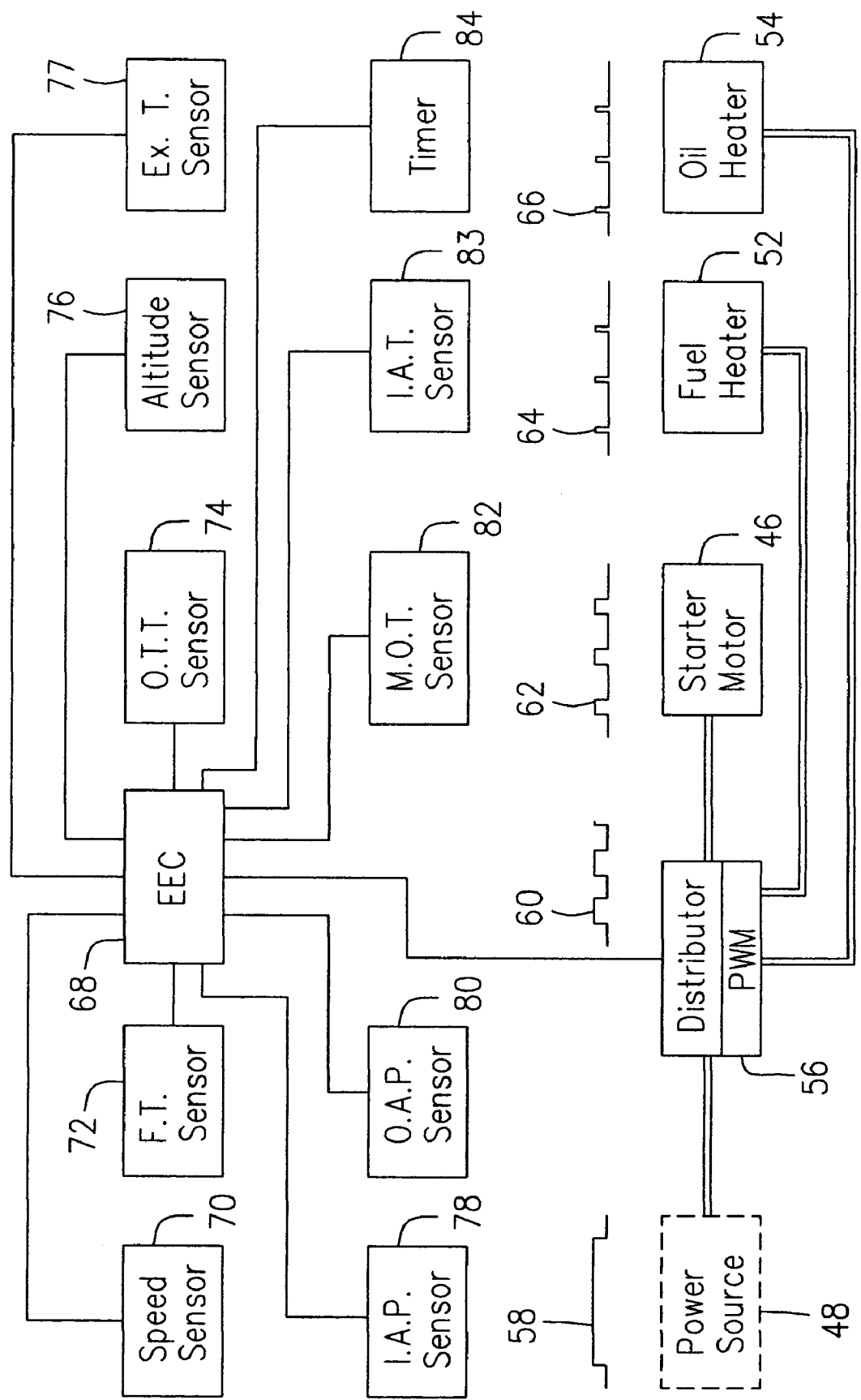
FIG. 2 is a diagram illustrating a gas turbine engine starting system incorporating one embodiment of the present invention.

Referring to FIGS. 1 and 2, there is provided an engine starting system which includes the starter motor 46 and at least one of but preferably both fuel heater 52 and oil heater 54 which are operably connected to the electric power source 48 through an electric power distributor 56. The electric power distributor 56 preferably includes a pulse-width modulator (PWM) (not indicated by numerals) such that a DC current 58 supplied by the electric power source 48 can be modulated as DC pulse output 60 from the electric power distributor 56, in order to achieve an adequately reduced total amount of electric power to be distributed between the starter motor 46, fuel heater 52 and oil heater 54. The amount of electric power distributed to each of the starter motor 46, fuel heater 52 and the oil heater 54 can also be regulated with the respective pulse width as indicated by numerals 62, 64 and 66 in order to achieve the particular individual power requirements.

The electric power distributor 56 is controllably linked to a controller which is preferably an engine electronic controller (EEC), but can be an independent controller. A plurality of sensors are connected to the EEC 68, which includes for example, a rotor speed sensor 70, a fuel temperature (F.T.) sensor 72, an oil tank temperature (O.T.T.) sensor 74, an altitude sensor 76, an exhaust duct temperature (Ex. T.) sensor 77, an engine inlet air pressure (I.A.P.) sensor 78, an engine outlet air pressure (O.A.P.) sensor 80, a main oil temperature (M.O.T.) sensor 82 and an inlet air temperature (I.A.T.) sensor 83. The EEC 68 usually also includes a timer 84. Thus, the EEC 68 can be pre-programmed with an algorithm specially designed for starting the engine 10 under various conditions using the signals from those various sensors which indicate the starting conditions. The engine inlet air pressure (I.A.P.) sensor 78 and engine outlet air pressure (O.A.P.) sensor 80 can be alternatively omitted, which will be further discussed below.

A method of starting a gas turbine engine using the starting system according to the present invention is further described with reference to FIGS. 1, 2, 3 and 4A–4C. During an engine starting cycle, there are generally two power inputs to rotate the engine rotor, which include a starting torque applied by the starter motor and a torque gradually applied to the high pressure and power turbines 16, 24 by combustion gases generated during the starting cycle after the light-off. The second power input varies during the starting cycle and therefore it is desirable to regulate the starting torque applied by the starter motor 46 during the starting cycle, in order to achieve an optimum starting cycle.

If the engine 10 is started during flight, a windmill effect will affect the starting cycle as an additional power input. Therefore a RAM parameter should be considered when the starter motor is regulated, for an optimum starting cycle. The RAM parameter refers to an air pressure differential across the engine inlet and outlet, representing a measurement of the windmill action. Therefore, the engine inlet and outlet air pressure sensors 78, 80 are used to measure the respective air pressures at the engine inlet and outlet, and then send corresponding signals to the EEC 68, as one of the input parameters thereto representing various engine starting conditions. The RAM parameter can also be measured by aircraft sensors (not shown) and sent to EEC 68 via aircraft interface. Therefore, the sensors 78 and 80 can be alternatively omitted.

In cold weather and particularly at a high altitudes, a lower fuel temperature will adversely affect the ignition thereof. Therefore, the fuel heater 52 is preferably installed in the vicinity of the respective fuel nozzles 22 to heat the fuel to an adequate level. The fuel temperature sensor 72 is preferably installed in the fuel circuit near the fuel nozzles 22 for sending a fuel temperature signal to the EEC 68, thereby indicating the temperature of the fuel immediately before ignition.

The oil heater 54 is preferably installed in the oil circuit, for example, immediately upstream of the oil pump (not shown) rather than in the oil tank 40, because it is more thermally efficient and quicker to increase the temperature of a portion of an oil flow in the oil circuit rather than increasing the temperature of the total amount of oil stored in the oil tank 40. The "main oil temperature" which refers to the temperature of the oil flow in the circuit and directly affects the oil flow properties, is of more concern than the temperature of the oil stored in the oil tank 40. Nevertheless, both the main oil temperature and the oil tank temperature are measured by the main oil temperature sensor 82 and the oil tank temperature sensor 74, respectively. The sensors 74 and 82 are installed in appropriate positions in the engine, and the signals indicating these temperatures are sent to the EEC 68 as input parameters representing the various engine starting conditions.

When a pilot of an aircraft initiates an engine starting cycle, the EEC 68 immediately receives engine starting input parameters of rotor speed, fuel temperature, oil temperature, altitude, exhaust duct temperature, engine inlet air pressure, engine outlet air pressure, main oil temperature, inlet temperature, and time signals from the respective sensors 70, 72, 74, 76, 77, 78, 80, 82, 83 and from the timer 84. These input parameters are processed with the algorithm installed in the EEC 68 in order to determine a total average current level C and the individual average current levels Ca, Cb, Cc to the starter motor 46, oil heater 54 and fuel heater 52, respectively, at the time T0, and sends corresponding control signals to the electric power distributor 56. The electric power distributor 56 then regulates the DC current supplied from the electric power source 48 into a DC pulse as indicated by numerals 62, 64 and 66 to each of the starter motor, fuel heater 52 and oil heater 54, respectively, in accordance with the control signals received from the EEC 68. The DC pulses 62, 64 and 66 are modulated with an instant width representing the average current Ca, Cb and Cc at the time T0 and the sum of the width of the DC pulses 62, 64 and 66 is equivalent to the DC pulse width 60 which represents the total average current C at the time T0.

After the engine starting cycle is initiated, fuel is provided to the fuel nozzles 22 and air is introduced into the engine and compressed by the high pressure compressor 14, for a combustion process to be initiated in the combustor 20. During the engine starting cycle, the engine starting conditions change constantly and so do the starting input parameters of the rotor speed, fuel temperature, exhaust duct temperature, engine inlet and outlet air pressures, main oil temperature and the engine inlet air temperature. The input parameter of altitude and oil tank temperature may or may not change during the engine starting cycle. Therefore, the EEC 68 processes those varying input parameters instantly and continuously and sends corresponding controlling signals to the electric power distributor 56 which regulates the electric current to the starter motor 46, fuel heater 52, and oil heater 54 with pulse-width modulation accordingly.

Figure 3:
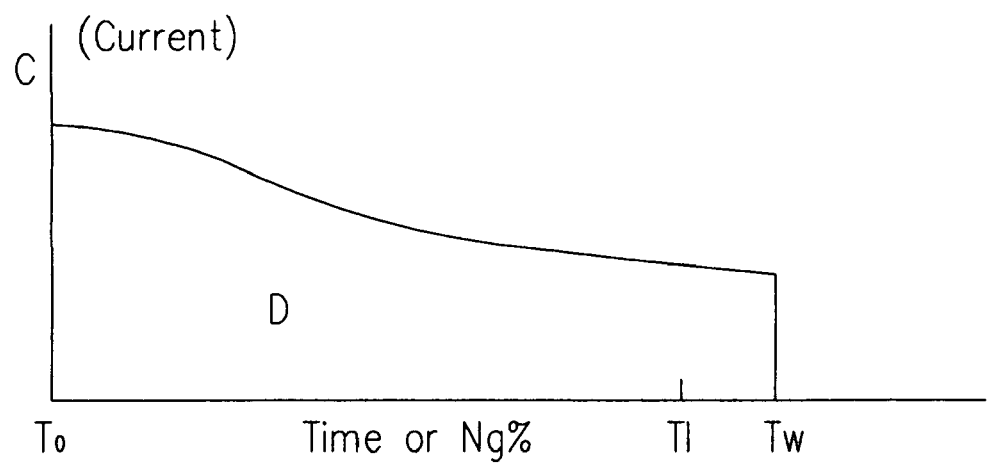
FIG. 3 is a graphical illustration showing a varying total amount of electric power distributed between a starter, an oil heater and a fuel heater during the starting cycle, in accordance with the present invention as illustrated in the embodiment of FIG. 2.
Figure 4A:
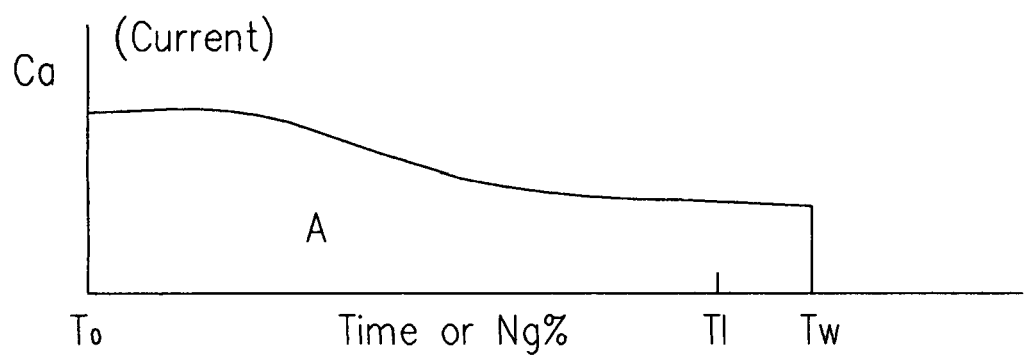
FIG. 4A is a graphical illustration showing a varying amount of electric power distributed to the starter motor during the starting cycle, in accordance with the present invention as illustrated in the embodiment of FIG. 2.
Figure 4B:
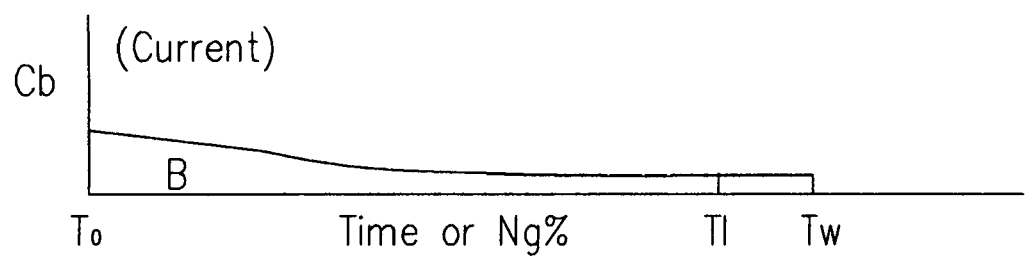
FIG. 4B is a graphical illustration showing a varying amount of electric power distributed to the oil heater during the starting cycle, in accordance with the present invention as illustrated in the embodiment of FIG. 2.
Figure 4C:
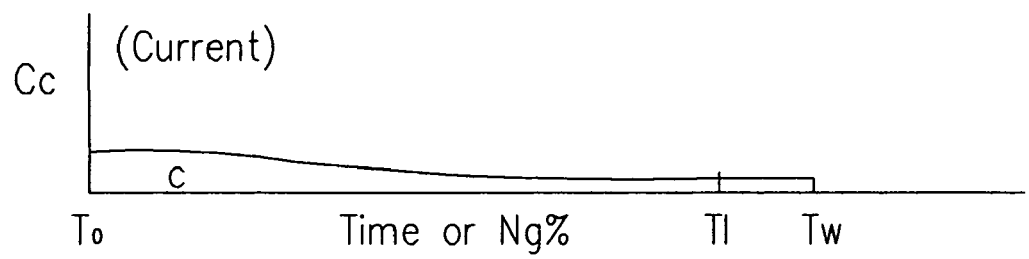
FIG. 4C is a graphical illustration showing a varying amount of electric power distributed to the fuel heater during the engine starting cycle, in accordance with the present invention as illustrated in the embodiment of FIG. 2.

Each graphic illustrated in FIGS. 4A–4C represents the average current (the pulses are smoothed out) distributed to the individual starter motor 46, oil heater 54 and fuel heater 52. The total current distributed between the starter motor 46, the oil heater 54 and the fuel heater 52 is illustrated in FIG. 3. As is clearly illustrated in these figures, the average current distributed to each and the total average current distributed between the starter motor 46, oil heater 54 and the fuel heater 52 are a function of the rotor speed or time. It is also understood that the average current distributed to each of, and the total average current distributed between, the starter motor 46, oil heater 54 and the fuel heater 52, are a function of at least one of but preferably all of the fuel temperature, oil tank temperature, altitude level, exhaust duct temperature, RAM, main oil temperature and engine inlet air temperature, which could be illustrated by graphics (not shown) similar to those illustrated in FIGS. 3 and 4A–4C. The average current distributed to each of the starter motor 46, oil heater 54 and fuel heater 52, is cut out at a time, as determined by the algorithm in the EEC 68 and depending on the varying input parameters to the EEC 68. The cut-out time points may be equal to each other (as illustrated at Tw in FIGS. 4A–4C), or may be different. Nevertheless, the average current distributed to the starter motor 46 is cut out at Tw which is always after a time point when the engine is light-off, as indicated by T1 in FIG. 4A. The light-off point T1 is detected by the temperature sensor 77 at or before the engine exhaust duct 26.

The total average current distributed between the starter motor 46, oil heater 54 and fuel heater 52 is cut out at the time Tw which is equal to a latest cut-out time point of the individual average current Ca, Cb and Cc, when they are different from each other. However, the simplified illustration shows that all of the currents C, Ca, Cb and Cc are cut out at the same time Tw. If the cut-out time of current Ca, Cb and Cc are not equal, the current C illustrated in FIG. 3 may represent one or two steps, reflecting the sudden drop of the total average current when the average current distributed to one or two of the three devices is cut out. An area D defined by the graphic in FIG. 3 is equal to a sum of areas A, B and C defined in the respective graphics in FIGS. 4A, 4B and 4C, reflecting the total electric energy distributed to the individual starter motor 46, oil heater 54 and fuel heater 52 during the engine starting cycle.

After the starter motor 46 is turned off at time Tw or after the total electric power is supplied to the starting system at the time Tw, the engine is running under its own combustion power because the engine is already light-off at the time T1. However, the engine operation is still in a transitional period acceleration in order to achieve an idling speed. Once the rotor speed sensor 70 detects an idling speed of the rotor, the EEC 68 receives such a signal and switches the engine operation from the starting cycle to a normal operation mode.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

I claim:

1. A method of starting a gas turbine engine comprising: providing fuel to a plurality of fuel nozzles; and
regulating a varying total amount of electric power supplied to at least one of a starter, a fuel heater and an oil heater, the varying total amount of electric power being regulated as a function of an engine rotor speed and a function of at least one parameter selected from parameters of a fuel temperature, an oil temperature, an engine inlet air temperature, an air pressure differential between an engine inlet and an engine outlet, and an altitude where the engine is positioned.

2. A method as claimed in claim 1 wherein the varying total amount of electric power is regulated with DC pulse-width modulation.

3. A method as claimed in claim 2 wherein the varying total amount of electric power is distributed between the starter, the fuel heater and the oil heater.

4. A method as claimed in claim 3 wherein a varying amount of electric power distributed to each of the starter, the fuel heater and the oil heater, is a function of at least one parameter selected from parameters of the speed of the engine rotor, the fuel temperature, the oil temperature, the engine inlet air temperature, the air pressure differential between the engine inlet and the engine outlet, and the altitude where the engine is positioned.

5. A method of starting a gas turbine engine comprising: providing-fuel to a plurality of fuel nozzles; and
regulating an electric power supply to distribute a varying total amount of electric power between a starter, a fuel heater and an oil heater.

6. A method as claimed in claim 5 wherein a varying amount of electric power distributed to each of the starter, fuel heater and oil heater, is a function of an engine rotor speed, a fuel temperature, an oil temperature, an inlet air temperature, the air pressure differential between an engine inlet and an engine outlet and an altitude where the engine is positioned.

7. A method as claimed in claim 6 further comprising a step of using pulse-width modulation to regulate the varying total amount of distributed electric power and the varying amount of electric power distributed to each of the starter, fuel heater and oil heater.

8. A method as claimed in claim 5 wherein the regulating of the electric power supply is controlled by an engine electronic controller.

* * * * *